(12) United States Patent
Carmichael

(10) Patent No.: US 11,216,899 B2
(45) Date of Patent: Jan. 4, 2022

(54) CONSENT OBTAINING MACHINE AND PROCESS

(71) Applicant: Connie Jordan Carmichael, Laguna Niguel, CA (US)

(72) Inventor: Connie Jordan Carmichael, Laguna Niguel, CA (US)

( * ) Notice: Subject to any disclaimer, the term of this patent is extended or adjusted under 35 U.S.C. 154(b) by 166 days.

(21) Appl. No.: 16/539,935

(22) Filed: Aug. 13, 2019

(65) Prior Publication Data

US 2020/0058089 A1 Feb. 20, 2020

Related U.S. Application Data

(60) Provisional application No. 62/719,546, filed on Aug. 17, 2018.

(51) Int. Cl.
| | |
|---|---|
| *G06K 7/14* | (2006.01) |
| *G06K 19/06* | (2006.01) |
| *G06Q 30/06* | (2012.01) |
| *G06Q 50/18* | (2012.01) |
| *H04L 9/32* | (2006.01) |
| *G06F 21/32* | (2013.01) |

(52) U.S. Cl.
CPC .......... *G06Q 50/188* (2013.01); *G06F 21/32* (2013.01); *G06K 7/1413* (2013.01); *G06K 19/06028* (2013.01); *G06Q 30/0619* (2013.01); *G06Q 50/18* (2013.01); *H04L 9/3234* (2013.01)

(58) Field of Classification Search
CPC .......... G06Q 50/18; G06F 16/00; G06K 19/00
USPC ............................ 705/311, 1.1; 235/375, 487
See application file for complete search history.

(56) References Cited

U.S. PATENT DOCUMENTS

| | | | |
|---|---|---|---|
| 2006/0188100 A1* | 8/2006 | Ring | G06Q 20/382 380/286 |
| 2011/0167059 A1* | 7/2011 | Fallah | G06Q 30/08 707/723 |
| 2012/0059767 A1* | 3/2012 | Uthmann | G06Q 90/00 705/319 |
| 2012/0158532 A1* | 6/2012 | Fitzsimmons | G06Q 30/0601 705/26.1 |
| 2017/0132738 A1* | 5/2017 | Geller | G06F 16/9558 |
| 2018/0247385 A1* | 8/2018 | Whitfield | G06Q 50/01 |
| 2019/0311376 A1* | 10/2019 | Melcher | G06Q 30/0185 |
| 2021/0118077 A1* | 4/2021 | Kuta | H04L 63/0861 |

\* cited by examiner

*Primary Examiner* — Edwyn Labaze
(74) *Attorney, Agent, or Firm* — Law Office of Scott C Harris, Inc

(57) ABSTRACT

An Iconsent application allows a party to consent to a transaction or to a romantic advance. The party is given a request, and if accepted, the acceptance is stored along with the biometric indicating that the authorized user did in fact carry out the acceptance.

16 Claims, 2 Drawing Sheets

CONSENT OBTAINING MACHINE AND PROCESS

This application claims priority from provisional application No. 62/719,546, filed Aug. 17, 2018, and entitled Consent Obtaining Machine and Process, the entire contents of which are herewith incorporated by reference.

BACKGROUND

Various actions in everyday life require consent from another party to take some action.

Confusion and disagreements can arise about whether a party has really given consent.

Even if one or both parties believe that consent has been obtained, a party can later deny it.

SUMMARY OF THE INVENTION

An embodiment recognizes a machine to capture consent of one or more parties to an action. The machine records and verifies the consent, to avoid later disagreements.

The present application describes a machine, which comprises software that can run on a server and a handheld computer such as a cellular phone, that memorializes a user's consent to take some action.

A user's consent is requested. The user then must carry out a step to positively identify themselves and after identification, take a positive step to show that the consent has been given. Information about the electronically-obtained-consent is then stored.

BRIEF DESCRIPTION OF THE DRAWINGS

In the Drawings.

the figures describe aspects of the invention, as described herein.

DETAILED DESCRIPTION

An embodiment describes a system that is carried out between a server computer such as 100 and a number of client computers such as 110. Each of the client computers can be a portable computer such as a mobile phone. Actions are carried out between the server and the client to obtain the users consent to some action or transaction, and also to record the user's consent.

Figure 1:
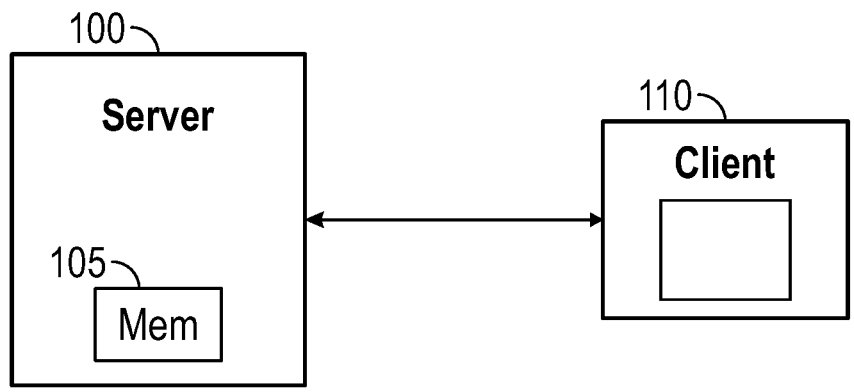
FIG. 1 shows a block diagram of the computer connection.
Figure 2:
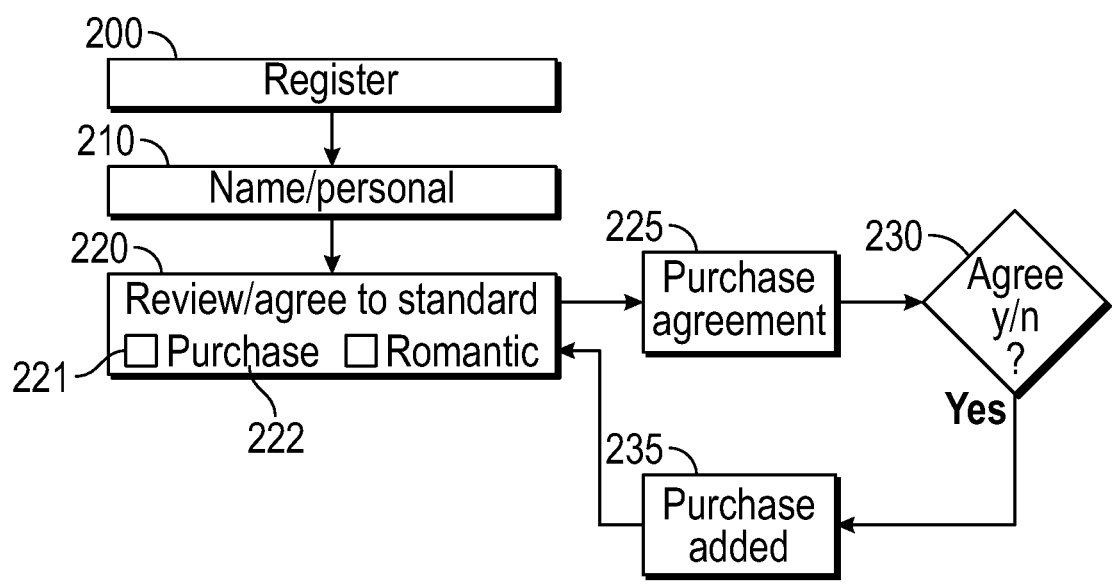
FIG. 2 shows a flowchart of operation for a purchase.

The action starts with the flowchart shown in FIG. 2. The user initially registers for the app as shown in the flowchart of FIG. 2. At 210, the user's personal information is entered. This can include the user's real name and address, a user-name and password, for example, as well as other personal information to be recorded at 210. This information is entered via the client computer 100 and stored within a memory 105 in the server computer. The personal information can include the user's address, as well as specific personal information about the user, including a personal identification number (PIN) and biometric information such as fingerprint, face ID iris scan, and others.

At 220, the user is given a number of different options of agreement forms that they want to review and agree to. The user can review and agree to any of these agreements as shown in 220.

For each of a plurality of categories, the user is provided with the option to opt-in to a specific form of consent. For each specific form of consent, the user is provided with a standard form agreement to which they can agree. Only a few of the consent options are shown in 220, and a number of the other options are described herein.

As example, the user can check the box 221 to indicate that they want to review and decide whether to agree to, a standard purchase agreement. The user is then provided with a purchase agreement, version A, to review at 225. The user can review the terms of that purchase agreement at 225. If the user agrees with terms of the purchase agreement, then at 230 the user clicks yes to signify agreement with the terms of that agreement. The system may re-prompt the user to make sure that the user is giving knowing and informed consent to agree to this form of purchase agreement in the future. If the user agrees at 230, then the purchase agreement is added to the user's acceptable agreements at 235. The user can also agree to other forms, including a form of romantic encounter.

Note at this point the user has only agreed to the form of the agreement, not to any specific agreement. However, when the user is later asked whether they want to agree with an agreement for party X, the system can indicate that the user has already agreed to the form of agreement A used by for party X. Therefore, the user only needs to decide if the transaction terms are acceptable. For example, the user can decide if they want to buy a bicycle for $20 using the standard agreement A. The user is only required to agree to bicycle (optionally with characterizing information about the bicycle, e.g., serial number, age, color, or other identifying information), for $20.

In one embodiment, this system allows users to review and consent to verbal agreements or written agreements of any kinds or nature, including purchases or receipt of goods or services, purchase of both tangible and intangible goods, purchase of tangible and intangible services, and others.

The system can use this to purchase many different things. The users can agree for example to purchase Services and goods on an airplane while in flight. This can be used for example to purchase seats, concessions, souvenirs, during any kind of event.

This can be used to obtain delivery signatures.

This can be used to obtain subway and bus train transactions as well as car, boat, plane and bicycle rentals. This can be used for banking transactions. This can be used for personal transportation, such as checking in, or upon entry to a vehicle to authenticate the rider and obtain consent for the fare being charged. This can be used for charitable contributions. This can be used for political contributions. This can use for tollroad passes. This can also be used for legal agreements such as settlement agreements in a court or in a business meeting. The system can be used for downloadable media such as software movies and videos. Any transaction, including these mentioned and others can use this system in this way.

In addition, in one specifically advantageous embodiment, this system can be used to obtain consent to a personal relationship. This can include addressing questions about whether the user has consented to any of, for example, a romantic advance, an advance of friendship, or an advance of a more intimate nature such as a sexual advance. Attempting a sexual advance without previous consent can be a sexual battery. This can be a way to avoid misunderstandings, and avoid putting people into compromising situations of this type.

In the embodiment where the consent is to a relationship between two parties, both parties need to have their identification verified. This is preferably done by having the apps on both parties' cellular phones. Both parties verify their identity on their own cellular phone, and agree to the terms of the consent. For example, this can be done by saying "I (first party) agree to have sexual relationships with (second party). This agreement is then associated with a biometrically verified signature of the first party and a similar agreement and biometric verification from the second party.

However in an alternative embodiment, the app can be on only one of the phones, and where both users enter their biometric information on the same phone and agree to the consent on the same phone. In the latter case, the second party (not the owner of the phone) must also enter a biometric identifying information either a face scan or fingerprint scan or the like, which is also stored based on actions by the second phone.

In embodiments, information is stored which verifies that both parties have agreed to the relationship.

For any of these systems, when the user opts in by checking the specific box, the user is given the standard terms of the consent agreement for the specific action to review. Once the user agrees with the form of that agreement, then that category for that consent agreement has been added and the user can agree in the future with the agreement without reviewing the form.

Each company, for example, can have their own purchase agreement and may require the user to opt into that company's form specifically. Many companies can share a common agreement, e.g., Agreement A. However, once the user agrees to a specific form of purchase agreement, as explained herein, the user can later use this application to determine or to obtain consent to that agreement.

Figure 3:
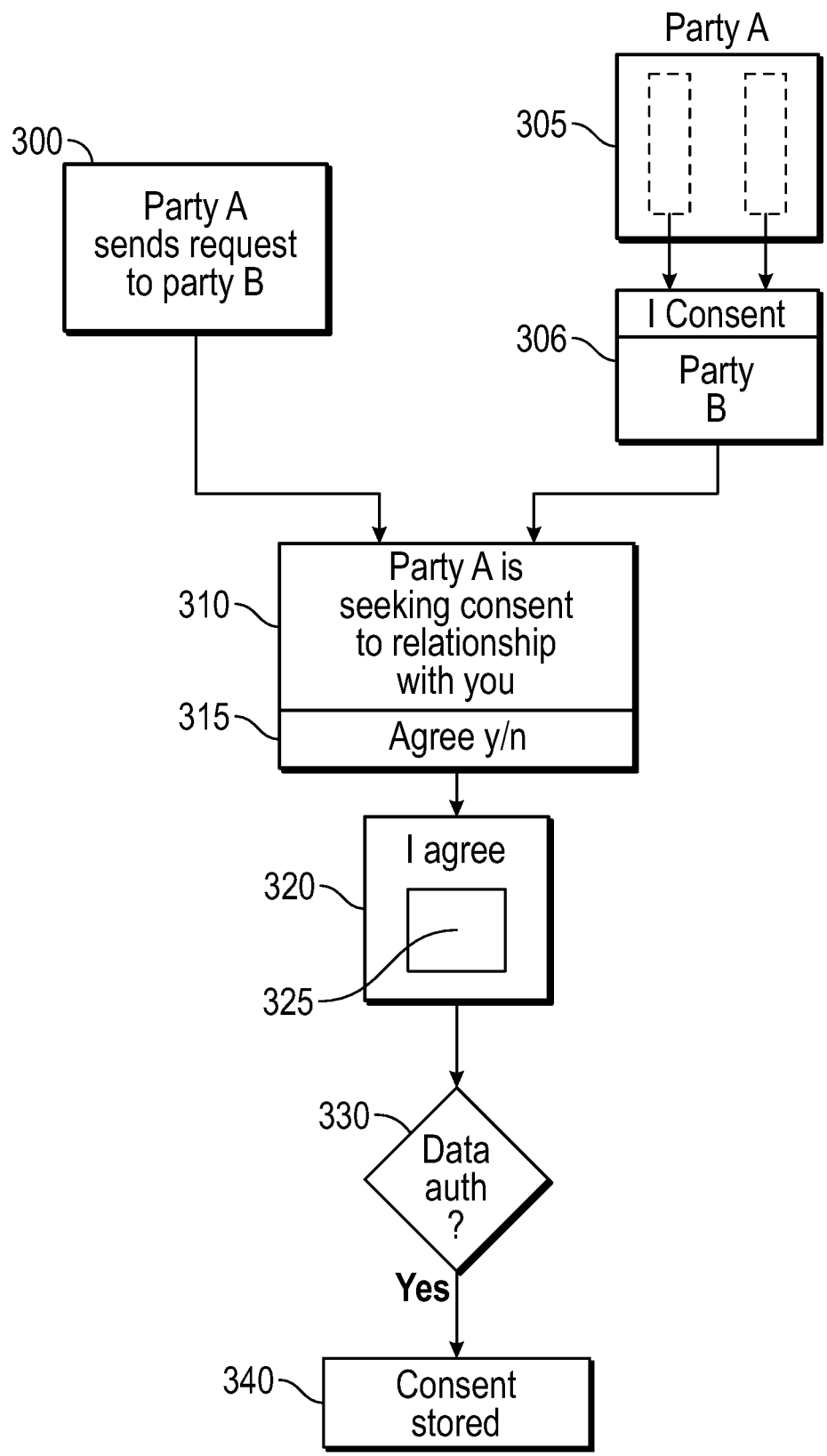
FIG. 3 shows a flowchart of operation for a multiple party action, such as a romantic encounter.

After the initial operations the operation proceeds as shown in FIG. 3.

An alternative embodiment, in which consent is being sought to a romantic or sexual relationship, is illustrated in FIG. 3.

At 300, a first party, who may be the person seeking consent to the sexual relationship sends a request for consent to the second person. This may be done as shown in FIG. 3 by party A sending a request to party B.

As in the first embodiment, the parties may review terms of the agreement separately from the agreement itself. Alternatively, in this embodiment, the parties may simply agree or consent to the relationship without any specific form.

Alternatively, however, party A may, as shown in FIG. 3, display a barcode on their phone, which barcode represents the fact that party a is requesting consent from party B. In this latter case, party B scans the barcode 305 with their cellular phone 306. In either case, the message 310 displays on party B's phone, where party B is the party being requested. The message requests consent to a relationship or sexual advance or other. This is displayed to the user of party B at 310.

In an embodiment, the barcode can be automatically generated for example by a social networking program, when the party A indicates that they want to request consent from party B.

At 315, the app asks party B whether they agree to the relationship.

If the Party B agrees, they indicate agreement at 320, and are required to enter a biometric data at 325 to confirm this agreement. In embodiments, the biometric data can be any kind of user specific information such as voice, fingerprint, handprint, iris recognition, face recognition, pin or passcode recognition or any other kind of personal information that can be stored to signify that the party be actually did agree.

The data is checked at 330 to determine whether the data is authorized, and the user has properly agreed. If yes, then the consent is stored at 340 and the transaction is allowed to proceed.

In one embodiment, video or image information showing both parties "consenting" is obtained, and stored, e.g., in a remote server.

In another embodiment, the stored information includes information which cryptographically evidences that the person has agreed to the transaction, for example information indicating that the user's identity has been biometrically ascertained, and information indicating that the user agreed to the specific terms. In one embodiment, the cryptographic information may include a feature vector that has a number of different items including a result of the biometric that indicates the proper user has agreed, and an indication from that user agreeing to the terms.

In one form, this can use a non-fungible cryptographic token, e.g, in one embodiment, an ERC-721 Ethereum blockchain token to store the information in its metadata.

The above describes using this with a mobile phone. This can be done however in addition using web connections, on a kiosk, e.g. a touchscreen, over any kind of wireless system, or a virtual reality or mixed reality device. In addition, this can use the sprocket style user interface described in our U.S. Pat. No. 8,677,280, or can use the virtual assistant user interface described in our U.S. Pat. No. 8,040,216.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer system which obtains consent to a transaction, comprising:
   a computer, operating to communicate with a plurality of different client computers, by accepting registration from a number of different users,
   and providing the users with an option to agree to any of plural different agreement forms, including at least first and second different agreement forms for first and second different kinds of transactions,
   and responsive to a user selecting an option to agree to the first agreement form, the computer providing the user with a standard form agreement corresponding to the first agreement form, to be used in subsequent transactions,
   where the first agreement form is of a type to be used for multiple different subsequent transactions of the first kind of transaction;
   and obtaining the user's agreement to the terms of the first agreement form, at a first time,
   where the user's agreement to the first agreement form is obtained without specific parties to the first agreement at the first time;
   the computer detecting the user indicating at a second time subsequent to the first time, after having agreed to the terms of the first agreement, that the user wants to carry out a transaction with a specific party using the first agreement form previously agreed to, responsive to the user, herein first party, indicating the first party wants to carry out a transaction with a second party using the first agreement form previously agreed to, the computer sending information, at the second time, about a specific first party to the transaction and second party to the transaction, where the information sent to at the second time does not include the first agreement form;

and where the computer stores information that evidences an identity of the first party, and specifics about the parties to the first agreement and, also stores information indicating that the first party and the second party has given consent to accept the agreement.

2. The computer system as in claim 1, wherein the first agreement form is a purchase agreement, and the specifics about the terms of the transaction include at least a price and an item being purchased.

3. The computer system as in claim 1, wherein the computer stores information that evidences an identity of the user, and specifics about the agreement and specifics about terms of the agreement separate from the agreement, and, also stores information indicating that the user has given consent to accept the agreement about both the user who is the first party to the transaction and also the second party to the transaction.

4. The computer system as in claim 3, wherein the agreement is an agreement between two parties of a sexual nature, with both parties giving consent to a sexual relationship.

5. The computer system as in claim 3, wherein the computer system obtains a biometric information from the user and stores information evidencing the biometric information.

6. The computer system as in claim 1, wherein the second party provides a scannable code indicative of the request, which is scanned by a computer associated with the first party.

7. The computer system as in claim 1, further comprising authenticating the user and storing information indicative of the authentication along with the agreement.

8. The computer system as in claim 1, wherein the transaction is a transaction for downloadable material.

9. A computer system which obtains consent to agreement forms, comprising:

a first computer, associated with a first user, having a user interface, that displays information by accepting registration from a number of different users, and providing the users with an option to agree to any of plural different agreement forms, including at least first and second different agreement forms for first and second different kinds of transactions, including the first agreement form which is requesting consent from two parties to a sexual encounter between the two parties, and the second agreement form which is fora purchase of a good or service;

and responsive to a user selecting an option to agree to the first agreement form, providing the user with a standard a form of an agreement corresponding to the first agreement form, to be used in subsequent transactions, where the first agreement form is of a type to be used for multiple different subsequent transactions of the sexual encounter between the two parties;

and responsive to a user selecting an option to agree to the second agreement form, providing the user with a standard a form of an agreement corresponding to the second agreement form, to be used in subsequent transactions, where the first agreement form is of a type to be used tor multiple different subsequent transactions for a purchase of the good or service;

said first computer obtaining verification of the first user's identity, and receiving verification of the second user's identity;

wherein for the first agreement form, the first computer generates and displays a request for the first user to consent to the sexual encounter, and receives the first user's consent to the sexual encounter, and also receives the second users consent to the sexual encounter and stores information indicative of both user's identity, the verification of both user's identities, and stores information indicating that both users have agreed to the sexual encounter, and wherein for the second agreement form, the first computer generates and displays a request for the first and users to agree to the purchase, and stores information indicative of both user's identity, the verification of both user's identities, and stores information indicating that both users have agreed to the purchase.

10. The system as in claim 9, where the information is stored as part of a cryptographic token that can be determined if authentic.

11. The system as in claim 9, wherein the verification is received by obtaining a biometric from the second user on the first computer.

12. The system as in claim 9, wherein the verification is received by getting biometrics from each user on their own computer.

13. The system as in claim 9, wherein the information requesting consent is a barcode to be scanned by another user.

14. The system as in claim 9 wherein the barcode is displayed on a social networking app.

15. The computer system as in claim 14, wherein the system includes a user interface that displays indications of the plural different agreement forms, enables the user to select which of the agreement forms that they want to agree to, accepts the user's agreement to each of the forms to make a previously agreed-to form, and subsequently allows the user to agree to a transaction using the previously agreed-to form.

16. The computer system as in claim 13, wherein the user initially agrees to at least the first agreement form for carrying out a purchase, and the second agreement form for carrying out a romantic encounter.

* * * * *